US010685057B1

(12) United States Patent
Chavez et al.

(10) Patent No.: US 10,685,057 B1
(45) Date of Patent: Jun. 16, 2020

(54) STYLE MODIFICATION OF IMAGES IN SEARCH RESULTS

(71) Applicant: SHUTTERSTOCK, INC., New York, NY (US)

(72) Inventors: Alexander Kikuta Chavez, Hoboken, NJ (US); Grace Mulan Li, Hoboken, NJ (US)

(73) Assignee: Shutterstock, Inc., New York, NY (US)

( * ) Notice: Subject to any disclaimer, the term of this patent is extended or adjusted under 35 U.S.C. 154(b) by 657 days.

(21) Appl. No.: 15/396,413

(22) Filed: Dec. 30, 2016

(51) Int. Cl.
*G06F 16/30* (2019.01)
*G06F 3/0482* (2013.01)
*G06N 3/08* (2006.01)
*G06F 16/58* (2019.01)
*G06N 7/00* (2006.01)
*G06F 16/248* (2019.01)
*G06F 16/9535* (2019.01)

(52) U.S. Cl.
CPC ........ *G06F 16/5866* (2019.01); *G06F 16/248* (2019.01); *G06F 16/9535* (2019.01); *G06N 3/08* (2013.01); *G06N 7/005* (2013.01)

(58) Field of Classification Search
CPC ............................ G06F 3/04817; G06F 3/0482
USPC ........................................................ 707/722
See application file for complete search history.

(56) References Cited

U.S. PATENT DOCUMENTS 8,326,091 B1 * 12/2012 Jing ...................... G06K 9/6224
382/305
10,042,935 B1 * 8/2018 Perkins ................. G06F 16/532
10,163,227 B1 * 12/2018 Lester ..................... G06T 9/002
2011/0055191 A1 * 3/2011 Bain ....................... G06F 16/84
707/706
2017/0221176 A1 * 8/2017 Munteanu ............ G06K 9/4628
2017/0249367 A1 * 8/2017 Bergsma ............... G06F 3/0482

OTHER PUBLICATIONS

Gatys et al. "Image Style Transfer Using Convolutional Neural Networks", Jun. 27-30, 2016, IEEE (Year: 2016).*
Gatys, et al., "Image Style Transfer Using Convolutional Neural Networks," The IEEE Conference on Computer Vision and Pattern Recognition (CVPR), Jun. 2016, pp. 2414-2423.
Hou, et al., "Deep Feature Consistent Variational Autoencoder," arXiv preprint arXiv:1610.00291, Oct. 2, 2016.

* cited by examiner

*Primary Examiner* — Syed H Hasan
*Assistant Examiner* — Robert F May
(74) *Attorney, Agent, or Firm* — McDermott Will & Emery LLP

(57) ABSTRACT

Methods for style modification of images in search results are provided. In one aspect, a method includes receiving user input identifying a search query from a client device, in which the search query indicates one or more predetermined search terms. The subject system determines a first collection of images that correspond to the one or more predetermined search terms and a second collection of images that exclude images that correspond to the one or more predetermined search terms. The subject system modifies images of the second collection to apply a keyword style that corresponds to the one or more predetermined search terms, and provides a listing of images to the client device. The listing of images includes both the first collection of images and the images of the second collection that are modified with the applied keyword style. Systems and machine-readable media are also provided.

19 Claims, 12 Drawing Sheets

STYLE MODIFICATION OF IMAGES IN SEARCH RESULTS

BACKGROUND

Field

The present disclosure generally relates to a computer-based image retrieval system, and more particularly to style modification of images in search results.

Description of the Related Art

Users commonly search for content such as digital images for producing a creative illustration using the searched images. Users can search for such digital images through a media collection. When a user performs a search, the image search system commonly matches a user's search terms with content items that are most relevant to a user's query. The scope of the search may be limited by the number of images in the media collection that contain features corresponding to each of the user's search terms.

SUMMARY

The subject system provides for the receipt of user input identifying a search query from a client device, in which the search query indicates one or more predetermined search terms. The subject system determines a first collection of images that correspond to the one or more predetermined search terms and a second collection of images that exclude images that correspond to the one or more predetermined search terms. The subject system modifies images of the second collection to apply a keyword style that corresponds to the one or more predetermined search terms, and provides a listing of images to the client device. The listing of images includes both the first collection of images and the images of the second collection that are modified with the applied keyword style to expand the search space with more relevant content items for a user's search query.

According to one embodiment of the present disclosure, a computer-implemented method is provided. The method includes receiving user input identifying a search query from a client device, in which the search query indicates one or more predetermined search terms. The method includes determining a first collection of images tagged with image identifiers that correspond to the one or more predetermined search terms. The method includes determining a second collection of images tagged with image identifiers that are exclusive of the one or more predetermined search terms. The method includes modifying images of the second collection of images to apply a keyword style that corresponds to the one or more predetermined search terms from the identified search query. The method also includes providing a listing of images to the client device, in which the listing of images includes the first collection of images and the images of the second collection of images that are modified with the applied keyword style.

According to one embodiment of the present disclosure, a system is provided including one or more processors and a computer-readable storage medium coupled to the one or more processors. The computer-readable storage medium includes instructions that, when executed by the one or more processors, cause the one or more processors to receive user input identifying a search query from a client device and determine that the search query indicates one or more predetermined search terms. The system can determine a first collection of images tagged with image identifiers that correspond to the one or more predetermined search terms. The system can determine a second collection of images tagged with image identifiers that are exclusive of the one or more predetermined search terms. The system can apply a keyword style that corresponds to the one or more predetermined search terms from the identified search query to images of the second collection of images. The system also can provide a listing of images to the client device, in which the listing of images includes the first collection of images and the images of the second collection of images that are modified with the applied keyword style.

According to one embodiment of the present disclosure, a non-transitory computer readable storage medium is provided that includes instructions that, when executed by a processor, cause the processor to receive user input identifying a search query from a client device and determine that the search query indicates one or more predetermined search terms. The instructions cause the processor to determine a first collection of images tagged with image identifiers that correspond to the one or more predetermined search terms. The instructions cause the processor to determine a second collection of images tagged with image identifiers that are exclusive of the one or more predetermined search terms. The instructions cause the processor to apply a keyword style that corresponds to the one or more predetermined search terms from the identified search query to images of the second collection of images. The instructions also cause the processor to provide a listing of images to the client device, in which the listing of images includes the first collection of images and the images of the second collection of images that are modified with the applied keyword style.

According to one embodiment of the present disclosure, a system is provided that includes means for receiving user input identifying a search query from a client device, in which the search query indicates one or more predetermined search terms The system includes means for: (1) determining a first collection of images tagged with image identifiers that correspond to the one or more predetermined search terms, (2) determining a second collection of images tagged with image identifiers that are exclusive of the one or more predetermined search terms, and (3) modifying images of the second collection of images to apply a keyword style that corresponds to the one or more predetermined search terms from the identified search query. The system also includes means for providing a listing of images to the client device, in which the listing of images includes the first collection of images and the images of the second collection of images that are modified with the applied keyword style.

According to one embodiment of the present disclosure, a computer-implemented method is provided. The method includes receiving user input via an application on a client device, in which the user input indicates a request to initiate an image search. The method includes generating, in response to the received user input, an image search query including one or more predetermined search terms from the user input. The method includes providing for transmission the image search query over a connection to a server, in which the server includes an image search service that determines a first collection of images tagged with image identifiers that correspond to the one or more predetermined search terms and a second collection of images tagged with image identifiers that are exclusive of the one or more predetermined search terms. The second collection of images can have images modified to apply a keyword style that corresponds to the one or more predetermined search terms from the image search query. The method includes receiving a listing of images over the connection in response to the image search query, in which the listing of images includes the first collection of images and the images of the second collection of images that are modified with the applied keyword style. The method also includes providing for display the listing of images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
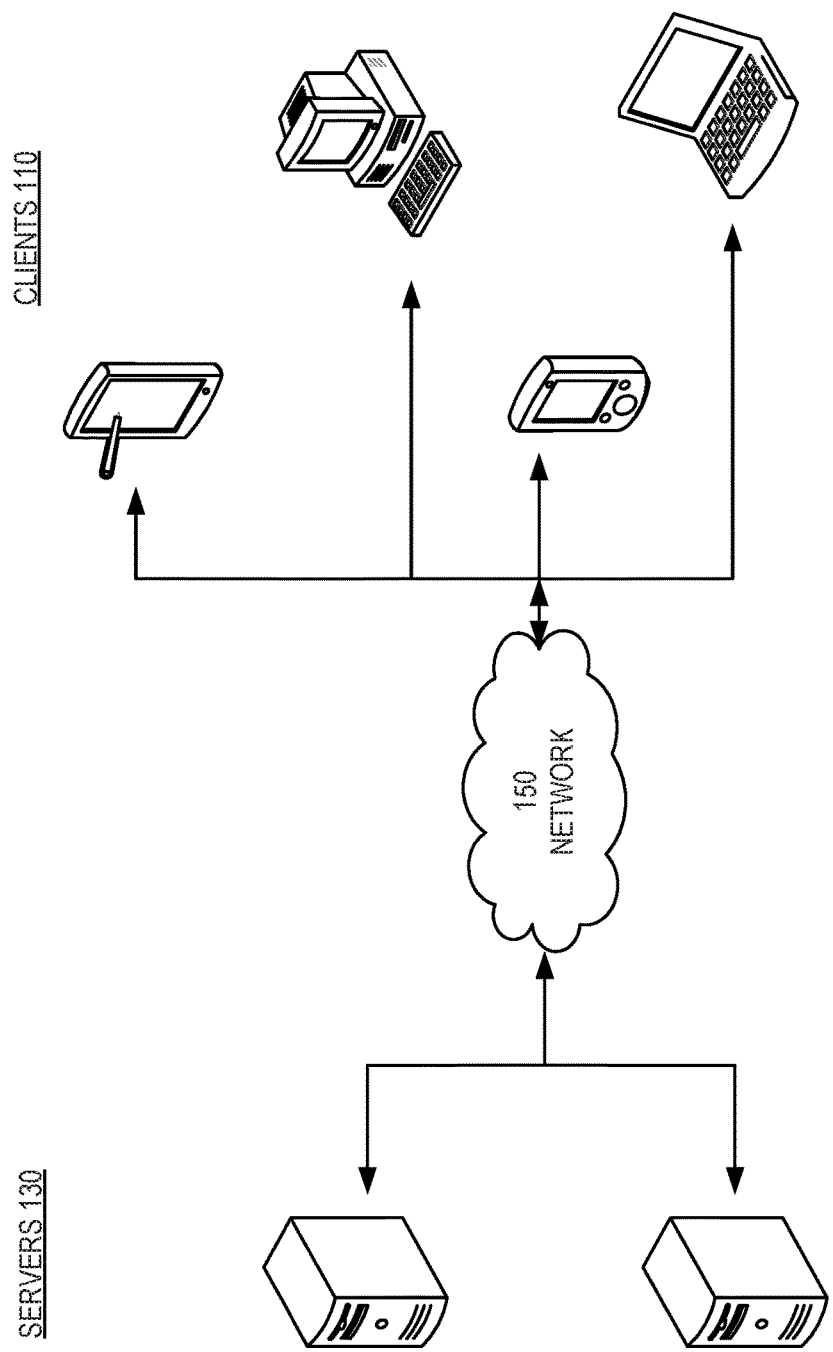
FIG. 1 illustrates an example architecture for image enhancements by style classification suitable for practicing some implementations of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

As used herein, the term "content item" may be, for example, in reference to a digital document that is composed of one or more media elements of different types (text, image, video, audio, etc.). A content item can be a single picture or a single video file. The term "image identifier" as used herein may refer to a form of metadata such as a tag and/or a label associated with an image for identifying the image.

In an information retrieval (IR) system, the IR system may use search query terms and/or other user input to perform a search through a repository containing content items. When a user performs a search, the IR system matches a user's search terms with content items that are most relevant to a user's query. One challenge with this approach is identifying images with style-specific features that are most relevant to the user's query. For example, suppose the search query "house on a hill" returns several relevant images in an image search engine, however, the image search engine does not return as many relevant results for the queries "house on a hill downpour," "house on a hill lighting," or "house on a hill blue sky." The difficulty with current image search engines is that when a user searches for such style-specific images, a traditional approach is to perform an image search using a term or phrase to get back a page of search results from a limited search space (i.e., many search items not containing the desired style features), thereby returning few results, lowering the overall accuracy of the image search, or increasing the overall latency of the image search when not all of the images are a complete match to the user search query.

The subject system addresses this problem specifically arising in the realm of computer technology by providing a solution also rooted in computer technology, namely, by considering a search engine system using a style classifier covering a set of styles intrinsic to environmentally-specific features. The style classifier can classify the strength with which an image exhibits certain known styles. The style classifier may use an algorithm that learns to detect the set of styles from a set of example images, referred to as training data. The style classifier includes training of a series of computer-operated neural networks, such as a convolutional neural network, to teach the neural network to identify features of images mapping to certain style classes for identifying those images that are responsive to an input search query with a probability that the images are deemed a certain style (e.g., weather-related style, seasonal style, time-of-day style, or any arbitrary style) depending on implementation. In certain aspects, the convolutional neural network is operated on a server and accesses large amounts of image data stored in memory of the server or stored elsewhere and accessible by the server in order to train the convolutional neural network. The style classifier may then be used to generate a style transfer model, which can modify images on its own. The style transfer model may be configured to modify parameters of an image on a pixel-by-pixel basis such that the style transfer model modifies the image as a whole (or at least in part) to be closer to what the style transfer model considers as an image that represents the input search query. The generation of the style transfer model may be a process for the model to learn how to automatically modify images to a certain known style.

In one or more implementations, a set of training images is provided to the convolutional neural network in order to teach the convolutional neural network to identify features of a training image, then process those features against a number of style classes that respectively correspond to a different concept (or keyword). The subject system produces a set of vectors representing the learned features for the corpus of images in the training data. The styles are learned from running the convolutional neural network over a corpus of the training data. For a provided input image, the style classifier model may generate a vector of probabilities, where each probability corresponds to a different style. Each probability represents the likelihood that the input image includes that corresponding style. The subject system determines the probability that an input image contains a certain known style (or a combination of known styles) based on a neural network learning algorithm using backpropagation. For example, the results from the style classifier may be combined to form a probability distribution that a certain input keyword (or concept) corresponds to a certain known image style. Once the convolutional neural network has been trained to predict probabilistically which features of the training images identify certain style classes, the subject system generates metadata for each image of an image collection (e.g., a tag identifying a set of associated keywords and/or associated styles, or a combination thereof).

The subject system provides several advantages over traditional IR processes: (1) the subject system provides a process for augmenting an image search engine with functionality to provide style classifications to content items and transforming existing images to an enhanced version of itself or to an artistically different style, for certain queries, such that the image search engine can filter through content and provide customized search results that are most relevant to a user's search query; (2) the subject system generates a specific list of categories (or terms) from a list of style classes in training data for which the technique of transforming an existing image with a new style would be targeted to apply; and (3) the subject system is adaptable to other applications (or pages) associated with image search engines. In particular, certain concepts such as weather, time of day, and season are particularly well-suited to apply as target styles for an image being transformed. The ability to generate a "lightning," "blizzard," "wintertime," "alpenglow," or "midday" version of an image as a replacement of (or supplement to) an existing image that would otherwise be excluded from image search results (e.g., generating an image of a house on a hill in a blizzard from an image tagged only with "house" and "hill," for the search query "house on a hill in a blizzard") would be a technical improvement to an image search engine. Additionally, having a list of words (or phrases) that can be used to produce a modified version of an image would be an improvement for a page that displays a single image.

The subject system improves with the expansion of the system's image collection by adding images of different styles (and/or enhanced versions) to the image collection based on existing images in the image collection found to lack such styles. The subject system identifies categories and words that may be used to modify a large set of images, and produce sensible modified versions of those images. In this respect, the subject system does not require original (or user-generated) images uploaded to the image collection in every possible style configuration. The system provides a machine learning capability where the system can learn from a content item and associated styles in order to refine search results with highly relevant content items. In this regard, the refined search results would yield content items with a range of styles that correspond more closely to the user's search query so that the user can select a content item that is determined to have a highly-relevant appearance. With this approach, the system can continually improve its accuracy by incorporating online learning into its style classifier and style transfer model. By presenting results to the user, identifying the media that a user interacts with, and examining the results that a user ignores, the system can continually learn and refine itself to match user preferences.

The proposed solution further provides improvements to the functioning of the computer itself because it saves data storage space and reduces network usage. Specifically, the computer hosting the collection of images to be searched is not required to maintain in data storage or repeatedly share over a network with the convolutional neural network classification information based on images used for training to be searched because the convolutional neural network, once trained, is configured to predict which features of the images in the collection of images correlated to particular style classes corresponding to those features without this information. In addition, the subject system modifies existing images in the image collection to generate new images for current (and/or subsequent) search results, thereby reducing the need to increase data storage space.

Although certain examples provided herein may describe a user's information (e.g., a user's search history identifying the user's interactions with images from a search result) being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

FIG. 1 illustrates an example architecture 100 for providing enhancements to images by style classification as responsive to an image search query from a user. The architecture 100 includes servers 130 and clients 110 connected over a network 150.

One of the many servers 130 is configured to host a computer-operated neural network. The neural network, which can be a convolutional neural network, is trained to identify features of images corresponding to one or more styles (e.g., weather-related patterns, seasonal, time-of-day, etc.). One of the many servers 130 also hosts a collection of images. The collection of images can be searched using an image search engine (e.g., accessible through a web page on one of the clients 110). Images from the collection can also be used to train the neural network to identify features of the images and, with the addition of data indicating associated keywords, once identified, are likely to indicate whether the image contains a style pattern that represents such keyword(s). The servers 130 can return images tagged with a corresponding keyword or category to the clients 110 in response to a search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
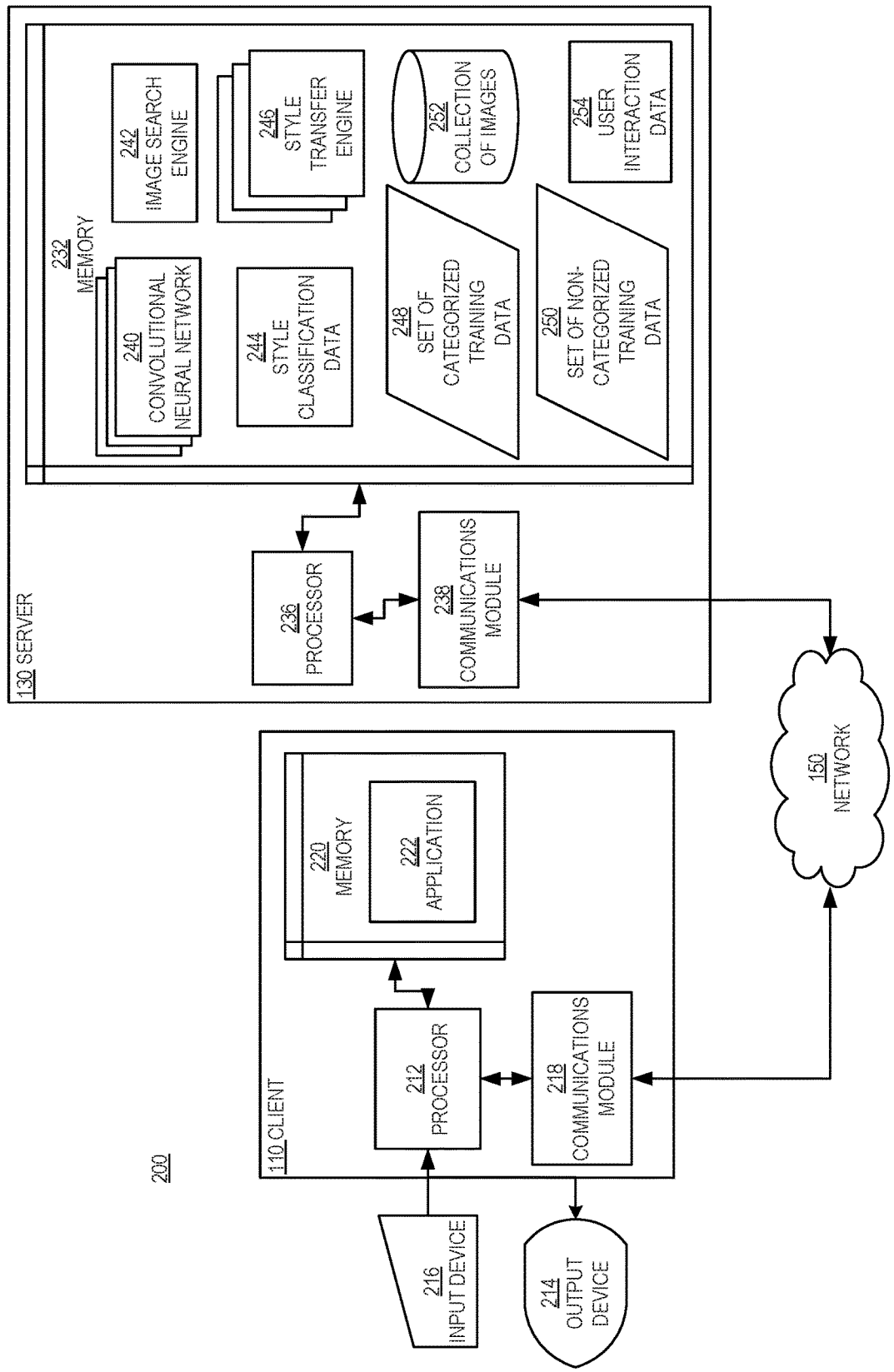
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240. In one or more implementations, the convolutional neural network 240 may be a series of neural networks, one neural network for each style classification. As discussed herein, a convolutional neural network 240 is a type of feed-forward artificial neural network using a supervised learning algorithm, where individual neurons are tiled in such a way that the individual neurons respond to overlapping regions in a visual field. The architecture of the convolutional neural network 240 may be in the style of existing well-known image classification architectures such as AlexNet, GoogLeNet, or Visual Geometry Group models. In certain aspects, the convolutional neural network 240 consists of a stack of convolutional layers followed by several fully connected layers. The convolutional neural network 240 can include a loss layer (e.g., softmax or hinge loss layer) to backpropagate errors so that the convolutional neural network 240 learns and adjusts its weights to better fit provided image data.

The memory 232 also includes a collection of images 252 and an image search engine 242 for searching the collection of images 252. In one or more implementations, the collection of images 252 represents a database that contains, for each image, a mapping from an image identifier (e.g., a tag) to a data file containing pixel data for the image (e.g., in jpeg format). The collection of images 252 can be, for example, a dataset of images used for training corresponding to a number of style classes (e.g., about 25). Each of the images may include an indication of its respective style classes applicable to the image. The images may be paired with image vector information and image cluster information. The image vector information may identify vectors representing a large sample of images (e.g., about 50 million) and the image cluster information may identify the vectors in one or more clusters such that each cluster of images represents a semantic concept (e.g., "weather," "time-of-day," "season," etc.).

Also included in the memory 232 of the server 130 is a set of categorized training data 248. The set of categorized training data 248 can be, for example, a dataset of content items (e.g., images) corresponding to a predetermined number of style classes (e.g., about 20 to 40 style classes) with a predetermined number of content items (e.g., about 10,000 images) per style class. The predetermined number of style classes may include, for example, a style class for a predetermined category (e.g., weather, season, time-of-day, etc.) and/or a style class for each predetermined keyword (e.g., "lightning," "blizzard," "sunny," "storm," "cloudy," "snowfall," "summer", "night", "dawn", etc.) associated with a particular predetermined category (e.g., "weather"). The predetermined categories and predetermined keywords may be stored in a data structure of the memory 232. The set of categorized training data 248 may include multiple instances (or sets) of training data, where each instance (or set) of training data is associated with a particular style class. For example, the set of categorized training data 248 may include images tagged with keywords associated with a known (or predetermined) category (e.g., images containing objects that represent a blizzard are categorized as weather-related images). The set of categorized training data 248 also may include image vector information and image cluster information, in which the image vector information identifies training vectors representing a large sample of training images and the image cluster information identifies clusters representing respective semantic concepts. In this respect, the vectors corresponding to a semantic concept (e.g., weather) are clustered into one cluster representing that semantic concept.

The memory 232 also includes a set of non-categorized training data 250. The set of non-categorized training data 250 can be, for example, a dataset of content items (e.g., images) that are tagged with identifiers (or keywords) that are exclusive from the predetermined categories and predetermined keywords associated with the set of categorized training data 248 (i.e., images that specifically are not tagged with any of the predetermined keywords). For example, the set of non-categorized training data 250 may include training images tagged with the keywords "house" and "hill," but excludes images tagged with the keywords "house," "hill" and "raining," where the keyword "raining" pertains to a keyword found in a list of predetermined keywords associated with the set of categorized training data 248. In some aspects, the list of predetermined keywords may be a fixed set of terms (i.e., fixed number of keywords corresponding to a fixed number of style classes). In one or more implementations, the processor 236, using the image search engine 242, gathers images belonging to each of the predetermined categories by receiving category words into the image search engine 242. For example, the image search engine 242 receives search query terms for a first search query of an offline session using the predetermined keywords "rainy," "lightning," "autumn," "night," "winter," "blizzard," and so on to gather images tagged with any of the predetermined keywords to form the set of categorized training data 248. In a second search query of the offline session, the image search engine 242 may search for images that specifically are not tagged with any of the predetermined keywords to form the set of non-categorized training data 250.

Although the set of categorized training data 248 and the set of non-categorized training data 250 are illustrated as being separate from the collection of images 252, in certain aspects the set of categorized training data 248 and the set of non-categorized training data 250 are subsets of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The memory 232 includes style classification data 244. The style classification data 244 may include information about style classifications available for the image search. The information may be metadata and/or labels identifying parameters for each of the style classifications. The style classification data 244 may identify a number of style classes such as lightning, blizzard, alpenglow, sunny, cloudy, snowfall, etc. for weather-related patterns, or midday, nighttime, twilight, dusk, dawn, etc. for time-of-day-related patterns, or autumn, summer, wintertime, etc. for seasonal patterns, or a certain corporate color style, or an arbitrary type of style class depending on implementation. The parameters may indicate a range of vector values that correspond to a particular style class such that the image search engine 244 may correlate the extracted image vector to vector values for a given style class. The values from the style classification data 244 may be accessible to the convolutional neural network 240 for training and/or the style transfer engine 246 for transforming the images. In one or more implementations, the style classification data 244 includes a list of the predetermined categories and the predetermined keywords. For example, the processor 236, using the image search engine 242, compiles a list of keywords (or terms) that are included in each of the predetermined categories (e.g., weather, time-of-day, season), which are then used to gather the images for training the style classifier model (e.g., the convolutional neural network 240). In this respect, one keyword may correspond to one style class in some embodiments, or a set of keywords may correspond to one style class in other embodiments.

In some aspects, the processor 236, using the style classification data 244, can tag each of the images in the collection of images 252 with metadata identifying an index to a style class in the style classification data 244. The tagging can serve as an indication of an association between a corresponding image and one or more style classes. The metadata may be a metadata file stored as a flat document or an index identifying a storage location in the collection of images 252. For example, the metadata file may include one or more rows of data including an image identifier, an image URL and a style identifier (e.g., identifying the corresponding style class).

The memory 232 also includes a style transfer engine 246 as part of a style transfer model. In one or more implementations, the style transfer model is a set of artificial neural networks, one artificial neural network for each style classification. The style transfer engine 246 may be used for unsupervised learning of efficient codings, where the aim of the style transfer model is to learn a representation (or encoding) for a set of data. In one or more implementations, the style transfer model is a feedforward, non-recurrent neural network. In certain aspects, the style transfer model consists of an input layer, an output layer, and several fully-connected hidden layers. The style transfer model can include a loss layer to back propagate errors so that the style transfer engine 246 learns and adjusts their weights to better reproduce the provided image data. In one or more implementations, the style transfer model utilizes one or more intermediate layers of the convolution neural network 240, a style image, and an optimization method to transfer a specific style to another image. In one or more implementations, the style transfer model is a variational autoencoder trained using the convolutional neural network 240.

The memory 232 also includes interaction history data 254. In certain aspects, the processor 236 is configured to determine the interaction history data 254 by obtaining user interaction data identifying interactions with images from image search results that are responsive to search queries. In this respect, the search results may be personalized based on the style class of the most-recent images downloaded or clicked by the user. For example, the processor 236 may determine that a user interacted with an image from a search result, such as, by clicking on the image, saving the image for subsequent access, or downloaded the image to a client (e.g., client 110), or the like. The processor 236 may keep track of the user interactions with a number of images over a given time period. In one or more implementations, the processor 236 may track metadata for a particular style class (e.g., weather-related patterns, time-of-day patterns, seasonal patterns, etc.) of the last N images that the user interacted with as well as a current user query, where N is a positive integer value. The interaction history 254 may also include data indicating search behavior (and/or patterns) relating to prior image search queries.

The processor 236 of the server 130 is configured to execute instructions, such as instructions physically coded into the processor 236, instructions received from software in memory 232, or a combination of both. For example, the processor 236 of the server 130 executes instructions to submit a plurality of training images (e.g., set of categorized training data 248, set of non-categorized training data 250) containing content identifying different concepts (e.g., weather-related patterns such as a blizzard or rain, seasonal patterns such as autumn or spring, or time-of-day patterns such as nightfall or midday) to the convolutional neural network 240 that is configured to analyze image pixel data for each of the plurality of training images to identify features, in each of the plurality of training images, corresponding to a particular semantic concept and receive, from the convolutional neural network 240 and for each of the plurality of training images, an identification of one or more style classes corresponding to the image processed by the convolutional neural network 240.

In certain aspects, the processor 236 of the server 130 is configured to receive a user input from a user. The user input identifies a search query in a given natural language. For example, the search query may be entered as an English term. A user of the client 110 may use the input device 216 to submit a search term or phrase via a user interface of the application 222. The user interface may include an input field where the search term or phrase may be typed in, for example. The input field may include one or more controls to allow the user to initiate the image search upon receiving the search query. In some aspects, the image search may be initiated automatically upon receiving at least one search term (or at least the search phrase in part). As described herein, the number of natural languages used is not limited to English, and the number of natural languages can vary to include other natural languages depending on implementation.

The search query is then provisioned to the image search engine 242 for initiating the image search through the collection of images 252. The user input is provided, for example, by the user accessing the image search engine 242 over the network 150 using the application 222 in the memory 220 on the client 110 of the user, and the user submitting the user input using the input device 216 of the client 110. For example, the user may use the input device 216 to enter the text-based search term or phrase. In response to the user input via the application 222, a processor of the client 110 is configured to transmit the search query over the network 150 using the communications module 218 of the client 110 to the communications module 238 of the server 130.

The processor 236 of the server 130, upon receiving the search query for the image search engine 242, is configured to submit a search request for the search query to the image search engine 242. In one or more implementations, the processor 236 determines whether the search query includes at least one term associated with the list of predetermined keywords (e.g., correspond to the list of weather, time-of-day, seasonality) in the style classification data 244. If the processor 236 determines that the search query includes at least one of the predetermined keywords, then the processor 236, using the image search engine 242, can perform two searches: (1) a search for images tagged with the at least one predetermined keyword, and (2) a search for images that are tagged with terms from the search query without the at least one predetermined keyword. As a result of the first image search, the processor 236 receives an identification of a plurality of images from the collection of images 252 tagged with the at least one predetermined keyword that are responsive to the search query, and is configured to provide a listing of images. The images returned in response to the second image search are then provided from the image search engine 242 to the style transfer engine 246 to transform these images into a version of that same image with the style that corresponds to the at least one predetermined keyword from the search query (referred to as "the keyword style"). The processor 236 provides the encoded (or transformed) images from the style transfer engine 246 to the listing of images such that the style-transferred images with the applied keyword style are added to the listing of images. The processor 236 may then provide the listing of images to the application 222 on the client 110 over the network 150 for display by an output device 214 of the client 110.

Figure 3A:
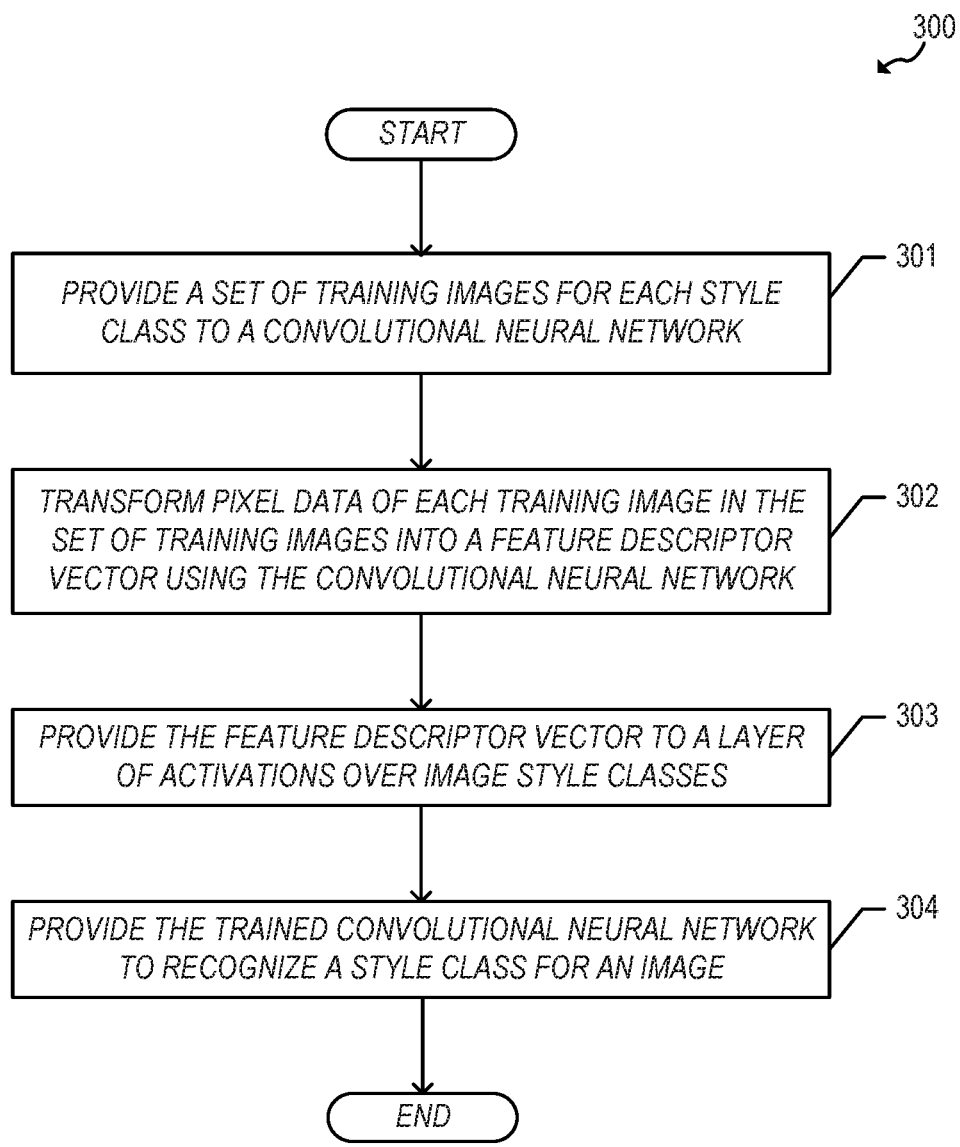
FIG. 3A illustrates an example offline process for training a classifier model using a convolutional neural network to predict a set of style classifications using the example server of FIG. 2.

FIG. 3A illustrates an example offline process 300 for training a convolutional neural network to analyze image pixel data to produce a style classifier model using the example server of FIG. 2. While FIG. 3A is described with reference to FIG. 2, it should be noted that the process steps of FIG. 3A may be performed by other systems.

The process 300 begins by proceeding from start step to step 301 where the set of categorized training data 248 (e.g., training images with styles that correspond to one or more predetermined keywords) is fed through the convolutional neural network 240. In one or more implementations, the training images are pairs comprising an image and a label, where the labels are either one of the predetermined style classes (e.g., "sunny", "blizzard", etc.) or a placeholder term ("unknown"). The convolutional neural network 240 can consist of a stack of eight layers with weights, the first five layers being convolutional layers and the remaining three layers being fully-connected layers. The set of training data 248 can be fixed-size 242×242 pixel Black-White image data or Red-Green-Blue (RGB) image data. In one or more implementations, the set of categorized training data 248 includes a data file containing pixel data for each training image. The set of categorized training data 248 may include a different set of training images for each style class. For example, the set of categorized training data 248 may include a first set of training images representing a weather-related style class, and a second set of training images representing a seasonal style class. The number of sets (or instances) of the training data included in the set of categorized training data 248 may be an arbitrary number and may vary depending on implementation. In one or more implementations, the set of non-categorized training data 250 is fed through the convolutional neural network 240 as part of step 301. The set of non-categorized training data 250 may be fed concurrently with the set of categorized training data 248 in some embodiments, or fed sequentially with respect to the set of categorized training data 248 in other embodiments.

Subsequently, in step 302, the convolutional neural network 240 transforms pixel data of each training image in the set of training images into a feature descriptor vector. For example, the convolutional neural network 240 extracts feature descriptors from the training images using convolution. Next, in step 303, the extracted features (or feature descriptor vectors) are fed into a layer of activations over the image style classes. Backpropagation may be used to update the weights in the network, using the activations over the style classes and the actual style classes that apply for each training image to update the network. In this respect, the convolutional neural network 240 can process input training data in order to learn to identify a relationship between an image and a style classification by analyzing pixel data of the image. Training with one or more sets of training data (e.g., the set of categorized training data 248, the set of non-categorized training data 250) may be regularized by weight decay and dropout regularization for the first two fully-connected layers with a dropout ratio set to 0.5, and the learning rate may initially be set to $10^{-2}$ and then decreased by a factor of 10 when validation set accuracy stops improving for the convolutional neural network 240. The feature extraction algorithm executed by the convolutional neural network 240 may be implemented with three fully connected layers of the convolutional neural network 240. The process to produce a style classifier ends following step 303. Subsequently, in step 304, the trained convolutional neural network 240 is provided to recognize a style class for an image. Once trained, the convolutional neural network 240 may provide a probability distribution over the style classes and "unknown".

Figure 3B:
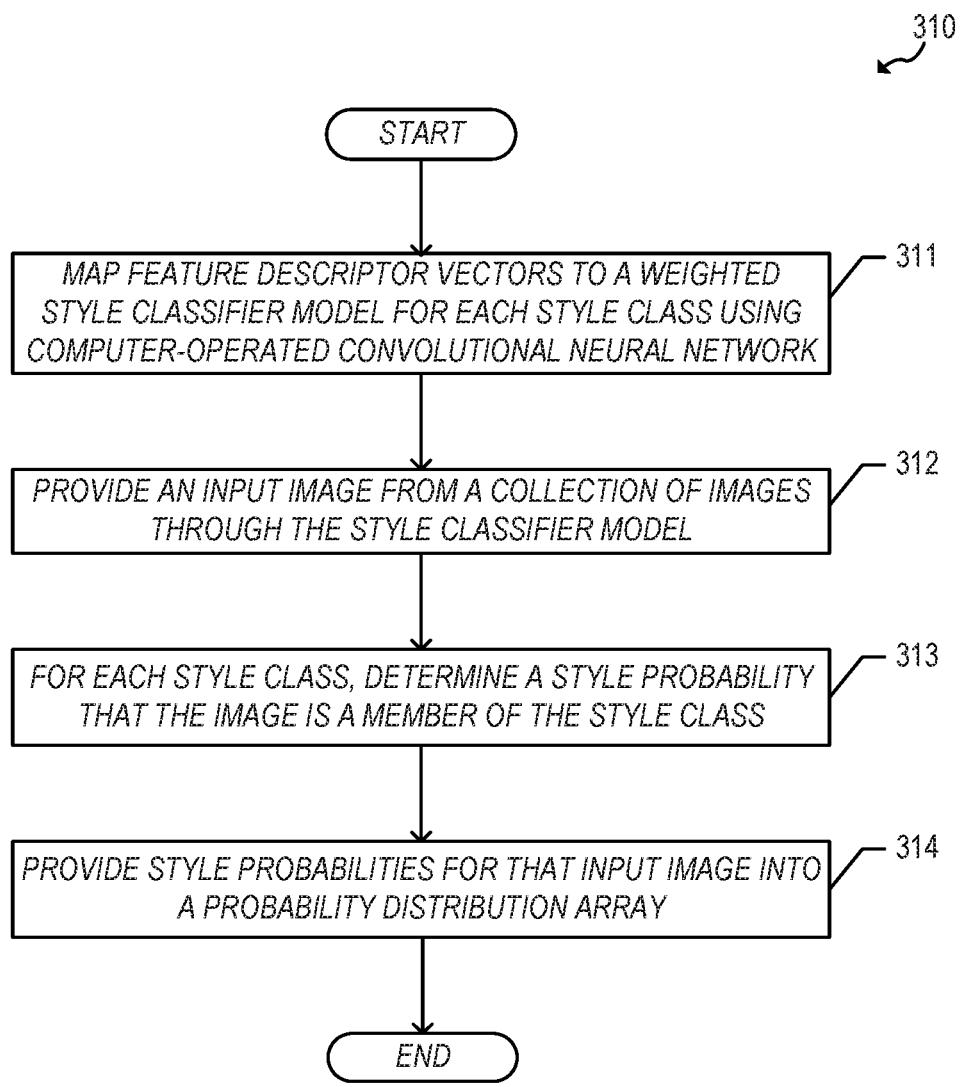
FIG. 3B illustrates an example runtime process for using a trained style classifier using the example server of FIG. 2.

FIG. 3B illustrates an example runtime process 310 for using a trained style classifier using the example server of FIG. 2. While FIG. 3B is described with reference to FIG. 2, it should be noted that the process steps of FIG. 3B may be performed by other systems.

The process 310 begins by proceeding from start step to step 311 where the convolutional neural network 240 maps feature descriptor vectors to a weighted classifier model for each style class. Next, in step 312, an input image from the collection of images 252 is fed through the style classifier model to determine a respective style probability for each style class.

Next, in step 313, for each style class, the style classifier determines a style probability that the example image is a member of that style class. In one or more implementations, the processor 236, using the convolutional neural network 240, determines that at least one object (e.g., a foreground object, a background object) in the example image has a probability of being a member of a respective style class. Each of the probability values indicates the likelihood that an image (and/or an object in the image) is a member of a corresponding style class based on pixel data of the image. In one or more implementations, an identifier such as a tag or a label associated with the example image may be used by the style classifier to determine the degree of association between the example image and the subject style class.

Subsequently, in step 314, the style probabilities from the style classifier are combined together into a probability distribution array for that input image. In one or more implementations, the probability distribution array represents a two-dimensional probability waveform, where the x-dimension refers to the keyword style classes and the y-dimension refers to probability values (e.g., in a range of 0.0 to 1.0) corresponding to the respective style classes. In one or more implementations, the processor 236, using the convolutional neural network 240, applies a softmax function to the data to output the probability distribution. In one or more implementations, the convolutional neural network 240 outputs an array of floating-point values, where each value in the array corresponds to one of the possible image style classes. The convolutional neural network 240 can determine which of the style classes corresponds to the highest probability. For example, the array element with the largest value may be the highest probability, and is therefore the style class that the convolutional neural network 240 predicts for that input image.

Figure 3C:
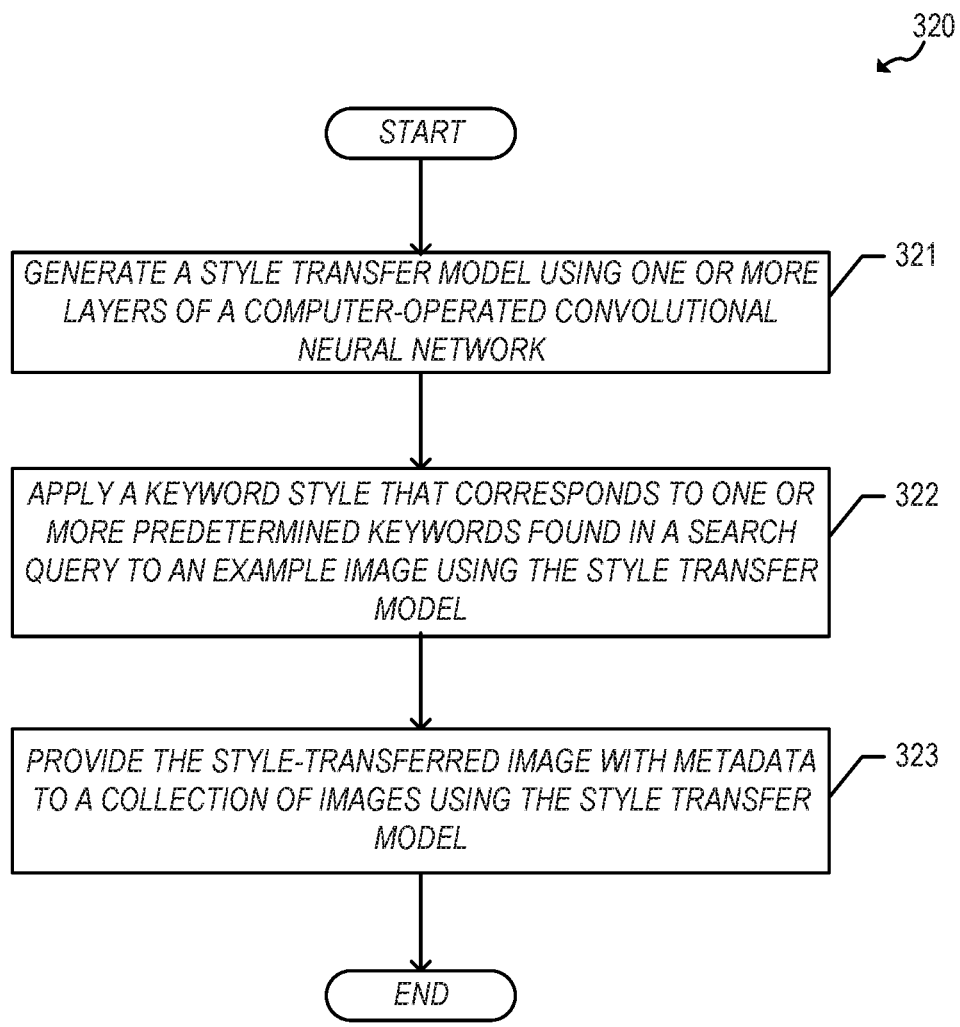
FIG. 3C illustrates an example process for generating and using a style transfer model to apply a specific style classification to example images using the example server of FIG. 2.

FIG. 3C illustrates an example process 320 for generating and using a style transfer model to reproduce a keyword style in example images based on learned keyword style features using the example server of FIG. 2. While FIG. 3C is described with reference to FIG. 2, it should be noted that the process steps of FIG. 3C may be performed by other systems.

The process 320 begins by proceeding from start step to step 321 where a style transfer model is generated using one or more layers of a trained computer-operated convolutional neural network. There may be other methods to generate the style transfer model using the convolutional neural network 240 depending on implementation. In one or more implementations, the style transfer model is generated without the need to train a separate model. In one or more implementations, the style transfer model is generated by training a separate variational autoencoder using the convolutional neural network 240.

In one or more implementations, the style transfer model uses the convolutional neural network 240 to apply a specific style of a source image onto a target image, where a first source image has the desired content (e.g., "house on hill"), a second source image has the desired style (e.g., weather, time, other, etc.), the target image is transformed into an image that has the content of the first source image and the style of the second source image, and the convolutional neural network 240 has learned the representations of both content and style, and has a predetermined number of filter layers from the convolutional neural network 240. In one or more implementations, the second source image is preselected for each predetermined keyword. In one or more implementations, the target image is a white noise image. The convolutional neural network 240 may be trained specifically to differentiate between predetermined styles in some implementations, and a pre-trained convolutional neural network (e.g., Visual Geometry Group neural network (VGG-Network)) may be used by the style transfer model engine 246 in other implementations. In one or more implementations, the processor 236, using the style transfer engine 246, encodes the content of the first source image in filter responses from certain layers of the convolutional neural network 240. In one or more implementations, the processor 236, using the style transfer engine 246, encodes the style of the second source image in the correlations of different filter responses across certain layers in the neural network. In one or more implementations, the processor 236, using the style transfer engine 246, selects one of the intermediate layers of the convolutional neural network 240 to obtain (or generate) content vectors for the first source image. In this respect, different layers may result in different resolution for content, where quality evaluation may be required to determine which layer to have selected. In one or more implementations, the processor 236, using the style transfer engine 246, determines weighting of certain layers to obtain (or generate) style vectors for the second source image. In this respect, different weights on different layers may result in different resolution for style, where quality evaluation may be required to determine which weights should be used on which layers. In one or more implementations, the processor 236, using the style transfer engine 246, then selects the relative weighting of the content and the style losses.

In one or more implementations, the processor 236, using the style transfer engine 246, uses the layer selection from step 321 as the choice of which layer for content vectors to generate content vectors for the first source image and the target image. The content loss may be the sum of squared difference between the content vectors for the first source image and the target image. In one or more implementations, the processor 236, using the style transfer engine 246, uses the layer selection from step 321 as the choice of which layer for style vectors to generate style vectors for the target image for the chosen intermediate layers. Using the calculated style vectors and the style vectors for the second source image for each layer, the sum of squared difference may be calculated. The style loss may be the sum of the weighted layer losses. In one or more implementations, the content and style losses are summed using the relative weighting to produce a total loss. In one or more implementations, the processor 236, using the style transfer engine 246, uses gradient descent to modify the target image to minimize a total loss. In this respect, the target image with the desired class transferred to it can then be output from the style transfer model.

In step 322, the style transfer model applies a keyword style that corresponds to one or more predetermined keywords found in a search query to an example image. For each keyword in the list of predetermined keywords (from the style classification data 244), the style transfer model maps an image (without a keyword style) to a modified version of itself (i.e., applying the keyword style) using the method described in step 321. In this respect, the style transfer model is able to modify an input image into a modified image of a learned keyword style.

Next, in step 323, the style transfer model provides the style-transferred image with metadata to the collection of images 252. In one or more implementations, the metadata indicates the keyword style applied to the example image. The operation of building an image search space (e.g., the collection of images 252) with proper metadata may be performed recursively in a closed loop until a set of example images, for a given style class and/or a set of style classes, includes a range of images with varying degrees of the given style class.

Figure 4:
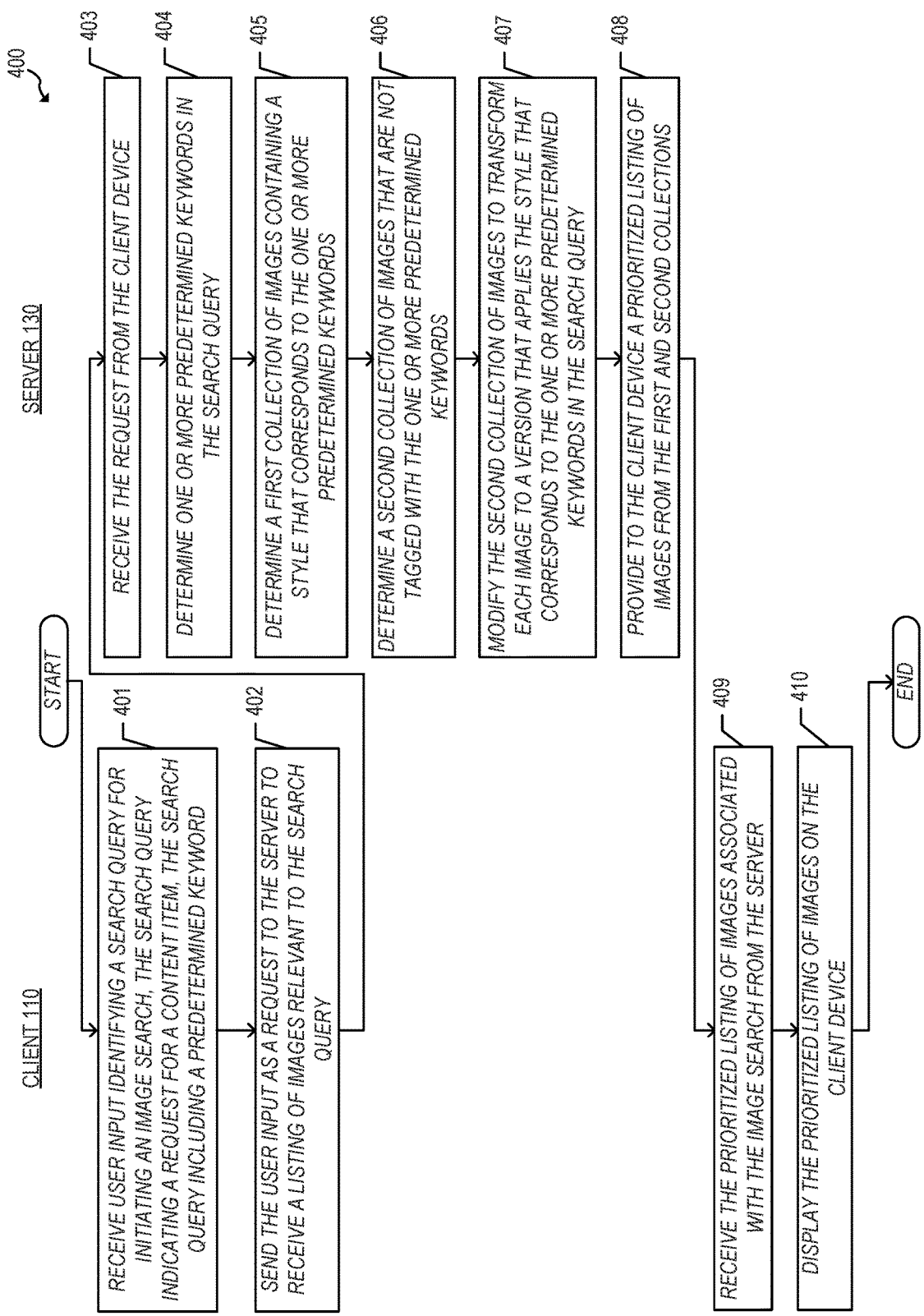
FIG. 4 illustrates an example process for an image search based on image enhancements by style classification using the example client and server of FIG. 2.

FIG. 4 illustrates an example process 400 for style modification of images in search results using the example client and server of FIG. 2. The process 400 begins in step 401 when a user, for example, loads an application 222 on a client 110 and the client 110 receives an input from the user using the input device 216 for a search query for one or more relevant images from a collection of images 252. The input identifies one or more search terms in a given natural language for initiating an image search. The user input may include one or more search terms that correspond to predetermined keywords identified to represent one or more predetermined categories (e.g., weather, seasonal, time-of-day) that trigger the image search engine 242 to initiate a search through the collection of images 252. In some aspects, the user input may include phrases, sentences and/or characters suitable for the image search. In this respect, a search engine may identify images that are responsive to a search query by identifying images of a certain style based on one or more style classes to which the identified image may be a member. The user can utilize the input device 216 to submit one or more search terms as part of a text-based search query via a user interface of the application 222. In some embodiments, the search query indicates a request for images with a certain feature (or style) based on the inclusion of one or more search terms in the search query that represent (or indicate) that style. For example, the user may set an indication via the application 222 that the user prefers a listing of images that contains a larger proportion of images showing "a house on a hill in a blizzard" compared to images only showing "a house on a hill."

Next, in step 402, the application 222 on the client 110 sends the user input as a request to the server 130 in order to receive a listing of images responsive to the text-based search query. Turning to the server 130, in step 403, the server 130 receives the request for a listing of images from the client 110.

Subsequently, in step 404, the server 130 can determine one or more predetermined keywords in the search query. For example, the search query (or request) may indicate a phrase "a house on a hill" with the inclusion of a search term "blizzard," and hence, the server 130 may determine that the search term "blizzard" corresponds to one of the predetermined keywords of the fixed set of terms. Next, in step 405, the server 130 determines a first collection of images associated with the one or more predetermined keywords found in the received search query. For example, an identification of a plurality of images from the collection of images 252 that are responsive to the one or more predetermined keywords in the search query is received, particularly images from the collection of images 252 that are tagged with an image identifier that corresponds to the one or more predetermined keywords. In this respect, the image identifier may be associated with a cluster of images that contain content relevant to the search term "blizzard."

Next, in step 406, the server 130 determines a second collection of images that are not tagged with the one or more predetermined keywords. For example, an identification of a plurality of images from the collection of images 252 that are responsive to one or more other keywords (exclusive of the predetermined keywords) in the search query is received, particularly images from the collection of images 252 that are tagged with an image identifier that corresponds to the phrase "house on a hill." In this respect, the image identifier may be associated with a cluster of images that contain content relevant to the search phrase "house on a hill," or associated with a plurality of clusters of images that respectively contain content relevant to the search terms "house" and "hill."

In step 407, the server 130, using the style transfer engine 246, modifies each image in the second collection of images to transform the image to a version of itself that applies the style that corresponds to the one or more predetermined keywords found in the search query. For example, the server 130 encodes an image that represents "a house on a hill" to include a style that represents a "blizzard," such that the ending result is a new image that represents "a house on a hill in a blizzard." In one or more implementations, the new image is provided to a search result listing and/or to the collection of images 252 for storage. In one or more implementations, the style transfer engine 246 receives a data file indicating the requested styles and/or identified keywords for association with the image being modified such that the style transfer engine 246 applies a style that corresponds to the one or more predetermined keywords found in the received search query to the image. In some embodiments, the server 130 modifies the image into a set of different versions of itself, where each version of the image represents a different style from a fixed set of styles. For example, the image may be modified to include respective versions with winter, spring and summer style features from a fixed set of seasonal styles, or the image may be modified to include respective versions with rain, snowfall and sunny style features from a fixed set of weather-related styles.

Subsequently, in step 408 the server 130 provides the client 110 with a prioritized listing of images that is prioritized by degree of relevancy to the search query. The prioritized listing of images may be aggregation of the images returned with tags corresponding to the predetermined keywords and images returned after being modified with the applied style such that each image in the listing of images has some degree of relevancy with the search query. The images returned as part of the first collection of images and as part of the modified second collection of images represent a subset of the overall number of images in the collection of images 252, thereby reducing the volume of the image search space, and hence decreasing the latency in identifying images with the relevant style class or classes.

Turning to the client 110, in step 409, the client 110 receives the prioritized listing of images associated with the search query from the server 130. Next, in step 410, the prioritized listing of images is provided for display via the application 222 of the client 110.

Figure 5:
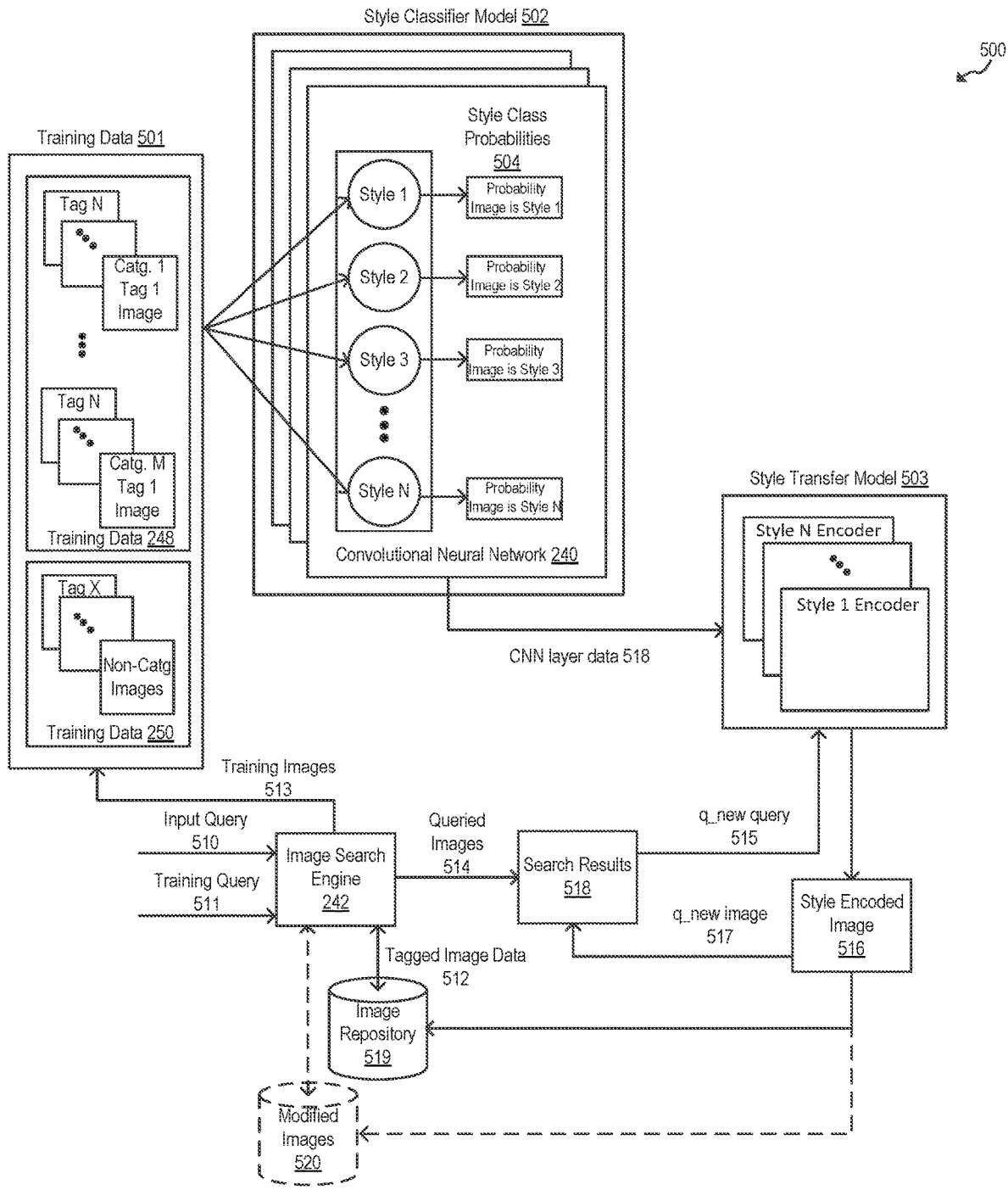
FIG. 5 illustrates a schematic diagram of an example architecture suitable for practicing the example process of FIG. 4.

FIG. 5 illustrates a schematic diagram of an example architecture 500 suitable for practicing the example processes of FIGS. 3A, 3B and 4. The architecture 500 illustrates the processes of FIGS. 3A-3C and 4 as a two-part process, where elements 501-503, 511 and 513, for example, relate to a first process that includes a training process of the convolutional neural network 240 to produce a probability distribution array of styles for a given image and a style transfer model to apply a desired style to an image (FIGS. 3A, 3B), and elements 510, 511 and 514-518, for example, relate to a second process that includes the processing of the user input for the forward-pass image search (FIG. 4). In this respect, the architecture 500 provides for an input search query to search for a first set of images tagged with image identifiers that map, or at least in part, to a predetermined term in the input search query and search for a second set of images that are not tagged with the predetermined term for encoding. In one or more embodiments, the operations relating to the first process are performed independent of the operations relating to the second process such that operations in the first process may be performed offline before the second process.

In one or more implementations, the processor 236 of the server 130 identifies a fixed set of categories (e.g., weather, time-of-day, season) and words to be used to modify images with styles that correspond to the identified words. The processor 236 compiles a list of terms (category words) that are included in each category. The processor 236 may store the compiled category words as a fixed set of terms in the memory 232 as part of the style classification data 244 or in a separate data structure accessible to the processor 236. In turn, the processor 236 submits a training query 511 to the image search engine 242 to gather images from the collection of images 252 that are associated with any of the categories from the fixed set of categories. For example, the processor 236 inputs category words into the training query 511 to search for images tagged with keywords that correspond to any of the supplied category words. These images (e.g., training images 513) returned in response to the training query 511 are then supplied as part of the overall training data 501 (i.e., the set of categorized training data 248). The set of categorized training data 248 may include M categories of images and N tags for each category, where M and N are positive integers. In addition, the processor 236 submits another training query 511 to the image search engine 242 to gather images that are specifically not tagged with any of the category words. Instead, the training query 511 may identify other keywords that are exclusive of the fixed set of terms. In return, the image search engine 242 accesses the collection of images 252 to obtain images with features that correspond to the other keywords. These images not tagged with any of the category words are then supplied as the set of non-categorized training data 250 as part of the overall training data 501.

The processor 236 of the server 130 may submit a plurality of training images (e.g., set of categorized training data 248 and set of non-categorized training data 250) to the convolutional neural network 240 that is configured to analyze pixel data for each of the plurality of training images to identify features in each of the plurality of training images. The convolutional neural network 240, running a supervised learning algorithm, processes the different images in the training data 501 to learn to identify features in the images and output whether the given image corresponds to at least one of the predetermined styles. In one or more implementations, the set of categorized training data 248 includes multiple sets of training images, where each set of training images corresponds to one particular style class. In this respect, the convolutional neural network 240 extracts features using convolution and transforms these features into a feature descriptor vector for mapping to a style class that corresponds to the particular set of training images. In some embodiments, each style class has its own convolutional neural network. In this respect, weights in a respective convolutional neural network 240 are trained during the training phase, and each of the convolutional neural networks 240 provides processed pixel data 502. In one or more implementations, the processed pixel data 502 includes pixel data for an image and a label for the image.

For each image, the style classifier model 502 produces multiple style class probabilities 504 using a number of style sub-classifiers in some embodiments, or a single style classifier in other embodiments. In some embodiments, the process of generating a style class probability from each of the style sub-classifiers may be performed in parallel of one another. Each of the style probability values (e.g., 504) may indicate the likelihood that an image is a member of a subject style class based on pixel data of the image. The style class probabilities 504 may then map to a probability distribution array indicating which of the predetermined styles is detected in the given image.

The processor 236, using the style transfer model 503, uses the CNN layer data 518 from the convolutional neural network 240 to modify an image (i.e., an image not tagged with any of the predetermined keywords) into a new version of itself having a style that corresponds to the one or more predetermined keywords encoded into the image based on the probability distribution array for the image. In one or more implementations, the style transfer model 503 is configured to run as part of two processes: 1) encoding a given style image as part of the offline process, and 2) encoding a given example image responsive to a user search query as part of the runtime process. The style transfer model 503 may include one or more style encoders (e.g., style 1 encoder, style 2 encoder, . . . , style N encoder), one style encoder for each predetermined style class. In one or more implementations, the style transfer model 503 receives input samples of images along with the same image with a specific style applied to it to learn the differences between an image containing the desired predetermined style and an image lacking the desired predetermined style such that the style transfer model 503 can reproduce the image containing the desired style based on any input image lacking the desired predetermined style. In some aspects, the style transfer model 503 is trained to transfer the style detected in the image containing the desired predetermined style to the image lacking the desired predetermined style by modifying pixels of the image originally lacking the desired predetermined style. Once trained, the style transfer model 503 can automatically apply the desired predetermined style to an original image lacking such style to create a new image (i.e., modified version of the original image) that contains the desired predetermined style. In some aspects, the style transfer model 503 may impact the colorization of the original image to obtain the new image with the encoded style. In one or more implementations, the style transfer model 503 does not need to be trained, and utilizes the convolutional neural network 240 to apply a predetermined desired style from a provided image containing that style to an image lacking the desired style.

In one or more implementations, the style transfer model 503 generates metadata indicating the style applied (or encoded) into the original image. In one or more implementations, the metadata includes pixel information indicating which of the pixels in the original image were modified and which parameters of the pixel were modified including the adjusted values. The metadata may include an image identifier identifying the image and/or corresponding style identifier identifying the style in the image. The data from the trained style transfer model 503 may be stored separately from image repository 519 or as part of the image repository 519. In one or more implementations, the data from the style transfer model 503 may be stored in a database separate from the image repository 519, such as for example a modified image repository 519. The modified image repository 520 may be accessible to the image search engine 242 independently of the image repository 519, or accessible via the image repository 519 depending on implementation. The collection of images 252 may be stored in the image repository 519 accessible to the server 130.

The processor 236 may receive data from user interaction data (e.g., 254) used to estimate the probability that a user is more or less interested in a particular style being applied to an image. In one or more implementations, the user interaction data 254 is obtained from previous search results associated with a user profile. The user interaction data 254 may indicate which styles a user preferred when the user interacted with an image in an image search result or other interface containing the image. The processor 236, using the style transfer model 503, can then produce a set of style-transferred images based on the user interaction data 254, where each image of the set of style-transferred images represents a style for which the user indicated a threshold likelihood of interest. The set of style-transferred images may be presented to the user in an interface for selection spatially relative to an image being modified with at least one of the styles corresponding to the set of style-transferred images.

The processor 236 of the server 130 is configured to receive an input query 510 from a user. The input query 510 identifies one or more search terms for initiating an image search. Upon receiving the input query 510, the processor 236, using the image search engine 242, submits the input query 510 to search the image repository 519 using one or more search terms in the input query 510. The processor 236 is configured to determine whether the input query 510 contains terms that correspond to terms of a fixed set of terms associated with a set of predetermined styles. If at least one term from the fixed set of terms is detected in the input query 510, then the processor 236 performs two independent search queries with the image search engine 242. In the first search query, the processor 236 searches for images that are tagged with at least one term in the input query 510 identified as a predetermined keyword. In the second search query (referred to as q new query), the processor 236 searches for images that are not tagged with any of the terms used in the first search query (i.e., using terms in the input query 510 excluding the predetermined keywords). In some aspects, the processor 236 removes the terms pertaining to the fixed set of terms from the first search query in order to form the second search query.

In turn, the processor 236 then receives an identification of a plurality of images from the collection of images 252 that are responsive to the first search query and the second search query. In one aspect, the plurality of images are tagged (e.g., 512) with a corresponding style identifier to denote that image's style class. In some aspects, the tagged image data 512 includes an image identifier along with the pixel data of the image. In one or more implementations, the tagged image data 512 includes the predicted probabilities of the style classes. The processor 236 provides search results 518 for a user using a listing of queried images 514 responsive to the first search query.

With respect to the images responsive to the second search query, the processor 236 passes these images (e.g., 515) through the style transfer model 503 in order to modify the images into a new version that applies the style corresponding to the predetermined keyword found in the input query 510. The images modified through the style transfer model 503 (e.g., 516) are then supplied to the search results 518 for presentation to the user (e.g., 517). In this respect, the images responsive to the first search query and the images modified by the style transfer model 503 are mixed together in the search results 518. In one or more implementations, the images modified by the style transfer model 503 may include an indication (e.g., highlight, border, pop-up notification, etc.) that the image was modified to apply a new style, and thereby distinguishable from other images not passed through the style transfer model 503.

In one or more implementations, the processor 236, using the image search engine 242, may obtain an image identifier that corresponds to the input query 510. For example, the input query 510 may include a search term "blizzard" (identified as one of the predetermined keywords) such that the image identifier associated with the search term "blizzard" is used to index the image repository 519. In this respect, a cluster of images that is relevant to the search term "blizzard" are indexed. Among the cluster of images, a subset of style classes corresponding to the phrase "house on a hill" may be identified to filter down the possible images responsive to the first search query. The style class "blizzard" may be used to filter search results for a given query "house on a hill blizzard". In turn, the filtered images are then provided as part of the search results 518. The processor 236 may provide the search results 518 to the application 222 on the client 110 over the network 150 for display by an output device 214 of the client 110. The search results 518 may be ranked according to a proportion that the user desires to retrieve more or less images modified with the applied new style.

In one or more implementations, a given image passed through the style transfer model 503 for encoding of a first desired style may undergo a second iteration through the style transfer model 503 to apply a second desired style. In one or more implementations, the style transfer model 503 may be configured to apply a combination of two or more different styles onto a given image such that the encoding of the two or more styles is performed in one iteration.

Figure 6A:
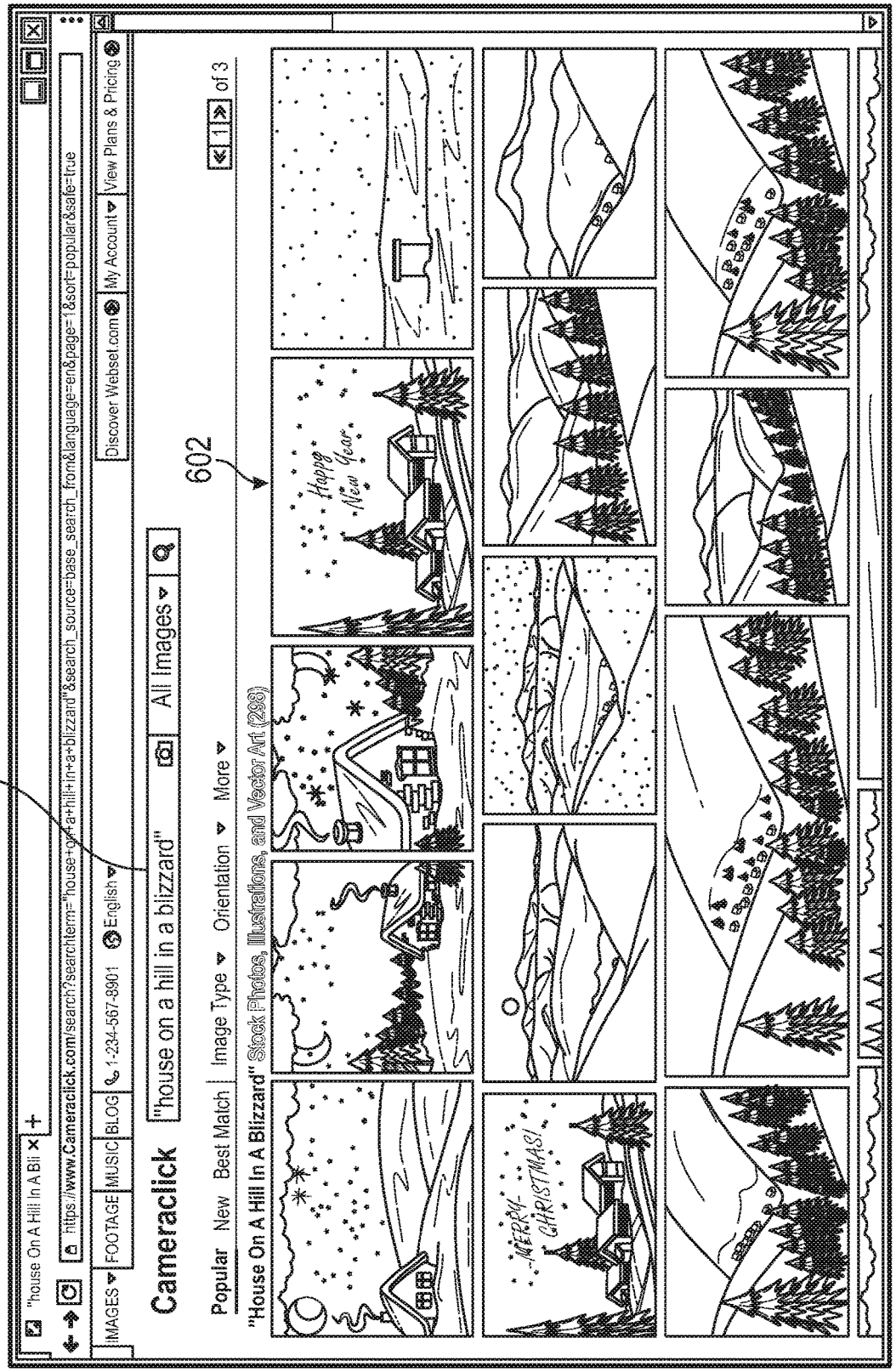
FIGS. 6A and 6B illustrate examples of a user interface for style modification of images in search results.
Figure 6B:
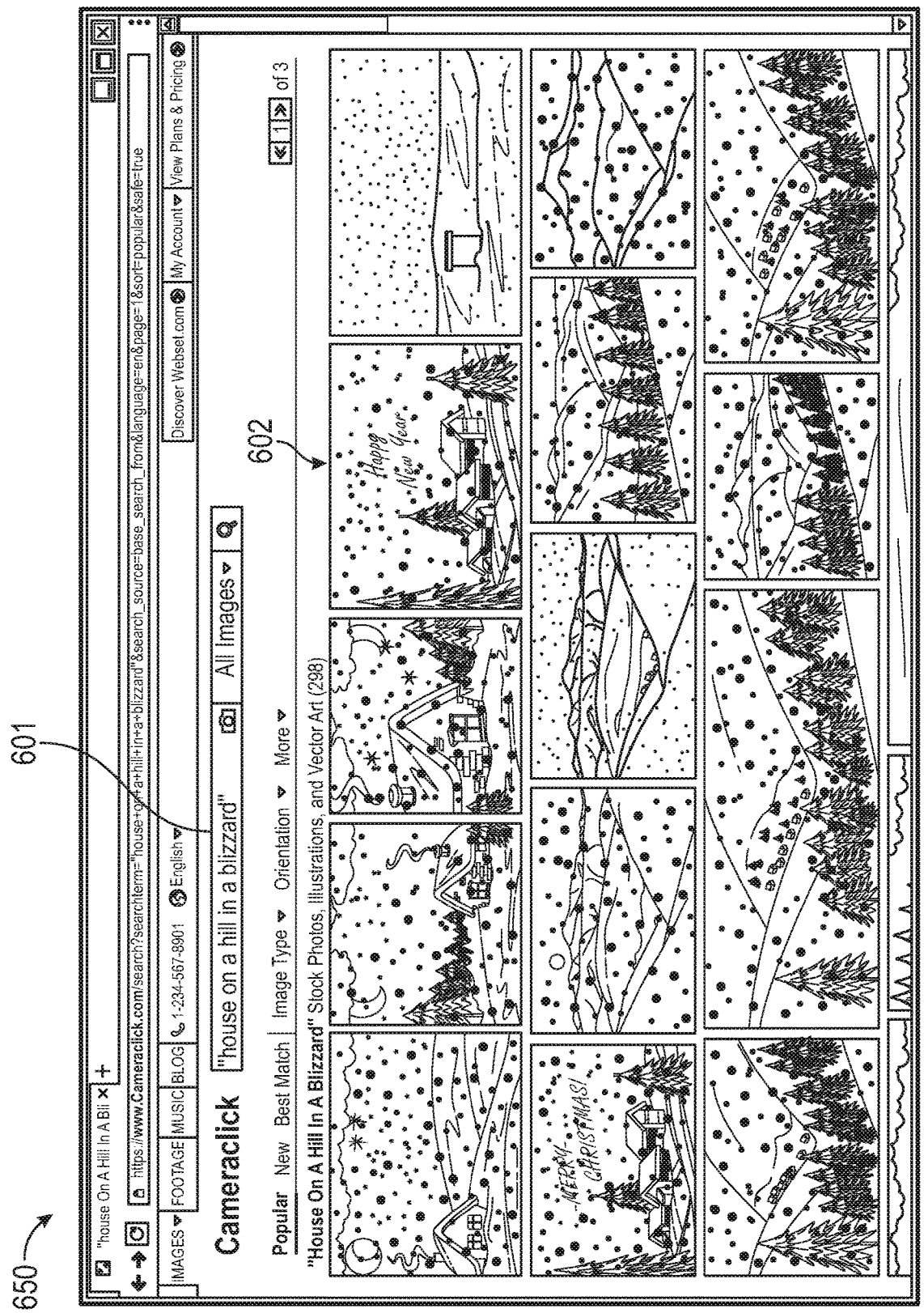

FIGS. 6A and 6B illustrate an example of image search results responsive to a particular search query. FIG. 6A provides an example of a user interface 600 for initiating an image search via an application 222 responsive to a given image search query. The user interfaces 600 and 650 includes an input section 601 and an output section 602. The input section 601 includes a search field for initiating the image search using the received image search query. Search results responsive to the image search query are provided for display via the output section 602. The output section 602 includes search results composed of a listing of images. The listing of images includes images corresponding to the search term and/or phrase in the image search query. The listing of images are displayed in a mosaic-based layout but the listing of images may be in a different layout depending on implementation. The listing of images may include a predetermined layout set by the image search service or by user preferences depending on implementation. In one or more implementations, the layout may be adjusted in real-time based on user interaction with the layout.

In FIG. 6A, the given image search query within the input field 601 includes the phrase "house on a hill in a blizzard," and therefore, the image search service returned the listing of images that includes images of houses on a hill in various versions that may or may not include the features of a blizzard depending on the image search space at the time of the search query. In FIG. 6B, the user interface 650 includes a listing of images where at least one image in the search results has been passed through the style transfer model 503 and modified to include a desired predetermined style (e.g., blizzard). In some implementations, the images returned in response to a search query that exclude the predetermined keywords are first passed through the style transfer model 503 for modification before being listed in the search results with the encoded style. In this respect, the disclosed system expands the image search space by generating new images based on existing images that are encoded with the desired style without the need of populating the collection of images 252 with new user-generated content in every possible style configuration.

Figure 7:
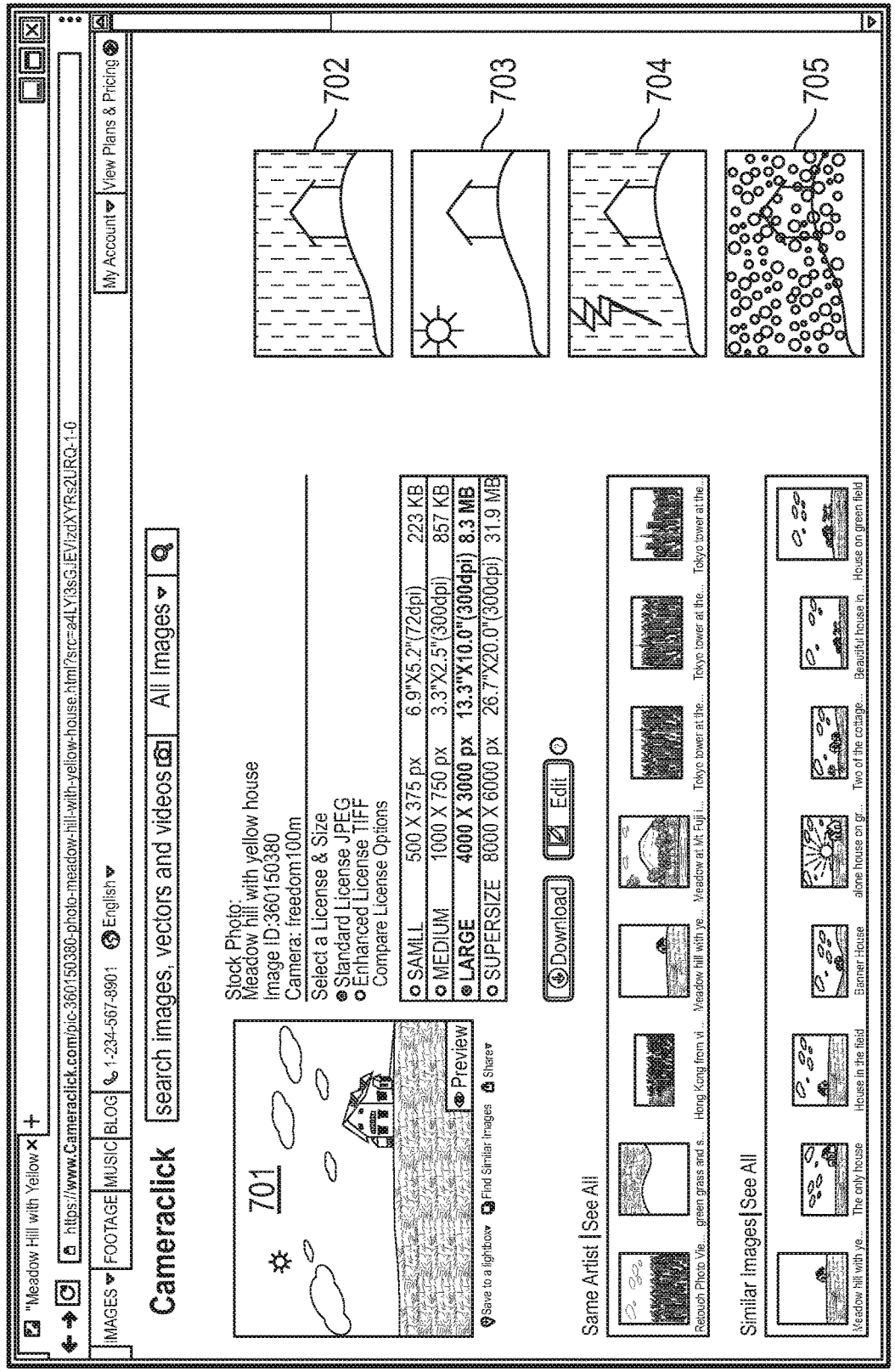
FIGS. 7 and 8 illustrate examples of a user interface providing encoded style options for a given image.

FIG. 7 illustrates an example of a user interface providing encoded style options for a given image. Specifically, FIG. 7 provides an example of a user interface 700 for initiating an image search service operation, such as a commercial transaction, via an application 222. The user interface 700 includes an image 701 that is responsive to a text-based image search query. In this respect, a user may be prompted to purchase a license to use the image 701 selected from a search result. The user interface 700 may include options to select different sizes of the image 701 including options to search for additional images associated with the same user (e.g., same artist) that generated the image 701 (e.g., uploaded to the image search service) or similarly-looking images in the collection of images 252.

In FIG. 7, the user interface 700 of the application 222 includes a section for displaying a listing of images with different encoded styles (e.g., 702-705). In one or more implementations, the processor 236, using the style transfer engine 246, transforms a given image (e.g., a house on a hill) into multiple versions of itself, where multiple predetermined styles are respectively transferred to the given image. In this example, the user interface 700 provides an image 702 encoded with a first predetermined style representing rainfall, an image 703 encoded with a second predetermined style representing sunny weather, an image 704 encoded with a third predetermined style representing lighting, and an image 705 encoded with a fourth predetermined style representing a blizzard. The user interface 700 may prompt a user to select one of the given style-transferred images (e.g., 702-705) to have the selected encoded style transferred to the image 701. In this respect, the image 701 may be passed through the style transfer model 503 for encoding the selected style into the image 701. In some aspects, a feature description vector representing the image 701 may be passed to the style transfer engine 246. In one or more implementations, the image 701 encoded with the selected style is displayed on the user interface 700 in real-time for enabling a user to proceed with the image search service operation.

Figure 8:
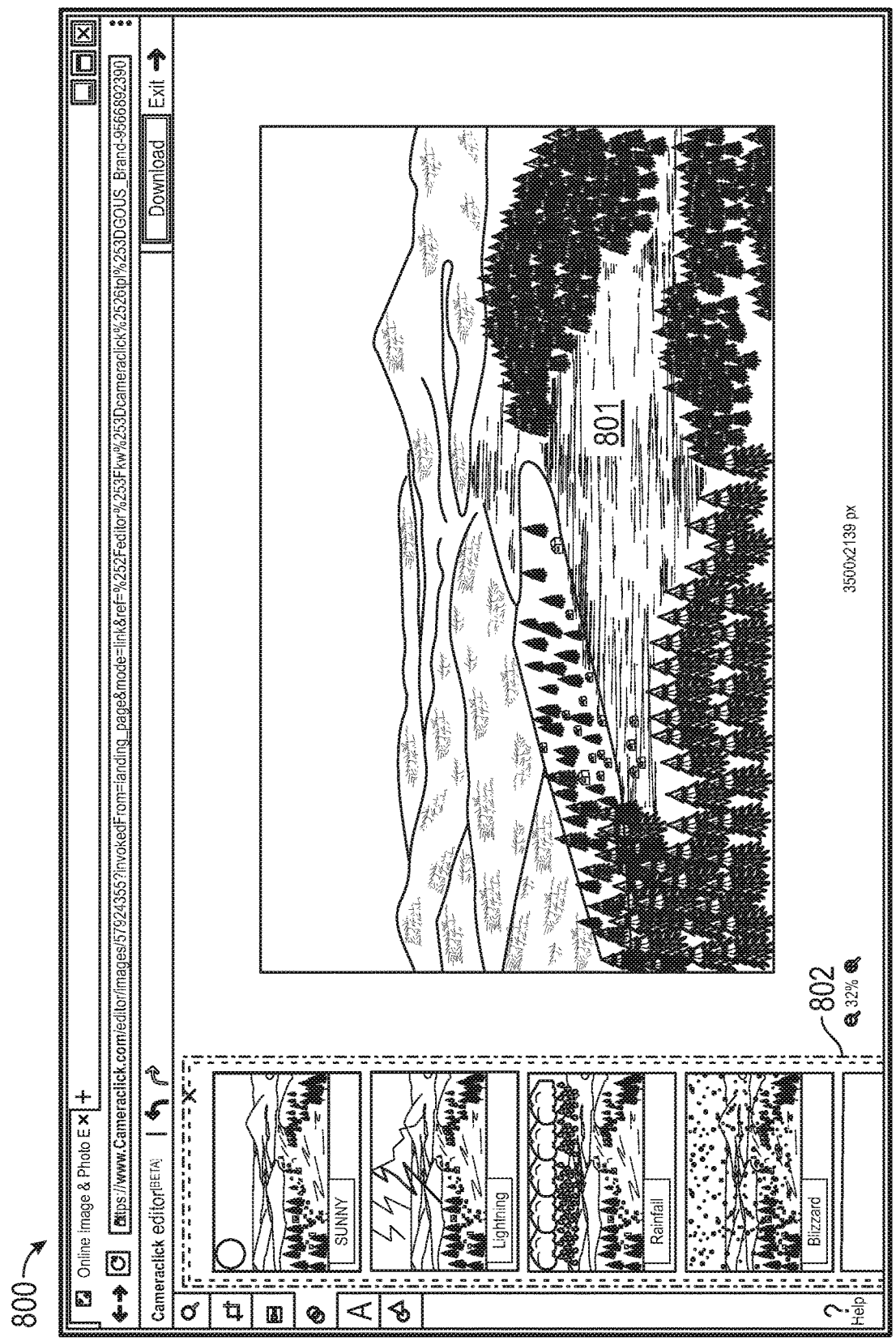

FIG. 8 illustrates an example of a user interface providing encoded style options for a given image. Specifically, FIG. 8 provides an example of a user interface 800 for initiating an image editing service via an application 222. The user interface 800 includes an image 801 that is provided for display in order to perform one or more editing operations that are configured to modify one or more characteristics of the image 801. The user interface 800 may include editing controls including an interface to select an encoded style option for the image 801 as one of the editing operations available via the application 222.

In FIG. 8, the user interface 800 of the application 222 includes a section 802 for displaying a listing of images with different encoded styles. In one or more implementations, the processor 236, using the style transfer engine 246, transforms a given image (e.g., a scenic landscape) into multiple versions of itself, where multiple predetermined styles are respectively transferred to the given image. In this example, the user interface 800 provides the image 801 encoded with different styles as possible options for editing the image 801. For example, the section 802 includes the image 801 encoded with a first predetermined style representing sunny weather, a second predetermined style representing lightning, a third predetermined style representing rainfall, and a fourth predetermined style representing a blizzard. The user interface 800 may prompt a user to select one of the given style-transferred images (e.g., 802) to have the selected encoded style transferred to the image 801. In this respect, the image 801 may be passed through the style transfer model 503 for encoding the selected style into the image 801. In some aspects, a feature description vector representing the image 801 may be passed to the style transfer engine 246. In one or more implementations, the image 801 encoded with the selected style is displayed on the user interface 800 in real-time for enabling a user to proceed with the image editing service.

Figure 9:
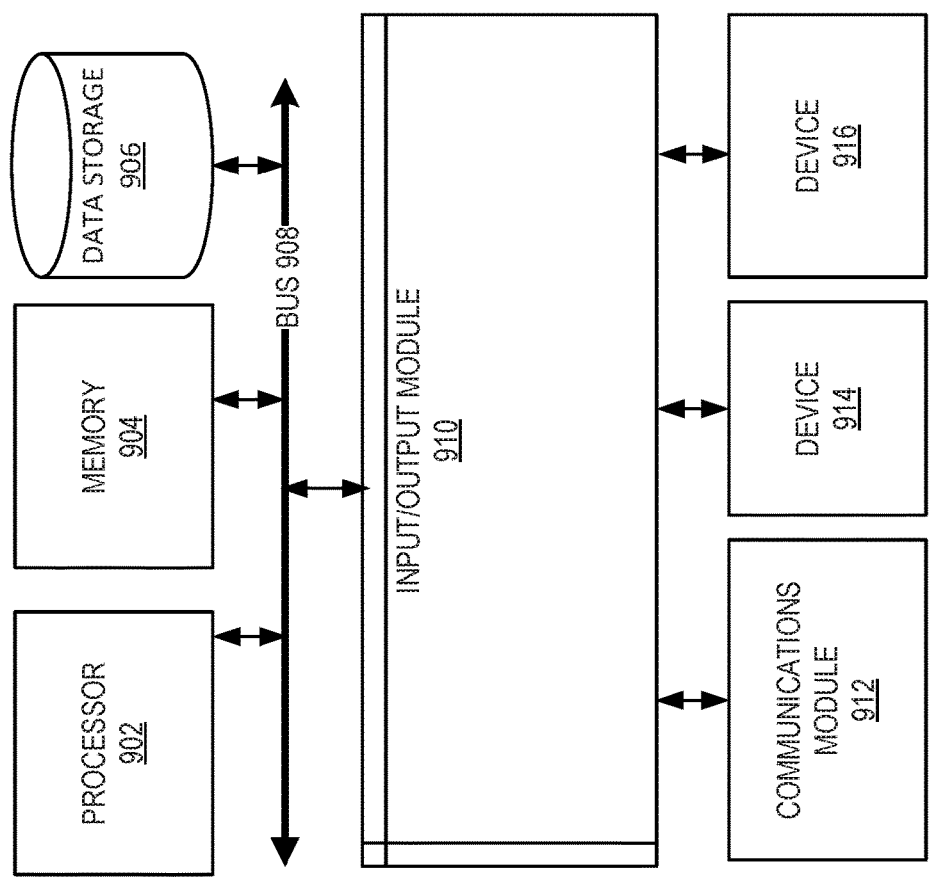
FIG. 9 is a block diagram illustrating an example computer system with which the client and server of FIG. 2 can be implemented.

FIG. 9 is a block diagram illustrating an exemplary computer system 900 with which the client 110 and server 130 of FIG. 1 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processor 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, the input/output module 910 is configured to connect to a plurality of devices, such as an input device 914 (e.g., input device 216) and/or an output device 916 (e.g., output device 214). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    receiving user input identifying a search query from a client device;
    identifying one or more predetermined search terms in the search query by determining search terms in the search query that match at least one search term in a set of predetermined search terms;
    identifying one or more standard search terms in the search query by determining search terms in the search query that do not match at least one search term in the set of predetermined search terms;
    accessing an image repository in a first search query, the first search query including the one or more standard search terms in the search query and the one or more predetermined search terms in the search query;
    based on the first search query, filtering through images in the image repository based on the one or more predetermined search terms in the search query;
    returning first images in a first collection of images from the filtered images, filtered based on the one or more predetermined search terms in the search query, that correspond to both the one or more standard search terms in the search query and the one or more predetermined search terms in the search query, the first collection of images including the returned first images;
    accessing the image repository in a second search query, the second search query including the one or more standard search terms in the search query and excluding the one or more predetermined search terms in the search query;
    based on the second search query, filtering through the images in the image repository based on the one or more standard search terms in the search query;
    returning second images in a second collection of images from the filtered images, filtered based on the one or more standard search terms in the search query, that correspond to the one or more standard search terms in the search query and are not associated with the one or more predetermined search terms in the search query, the second collection of images including the returned second images;
    determining a keyword style that corresponds to the one or more predetermined search terms in the search query;
    applying the keyword style to the images in the second collection of images that result in a visual modification of the images in the second collection of images; and
    providing a listing of images of the client device, the listing of images including the first collection of images and the images of the second collection of images that are modified with the applied keyword style.

2. The computer-implemented method of claim 1, wherein applying the keyword style to the images comprises encoding one or more pixels of an image with the keyword style for each image of the second collection of images.

3. The computer-implemented method of claim 1, further comprising:
    providing for display at least one image of the second collection of images in a first region of a user interface;
    obtaining a plurality of versions of the at least one image, each version of the plurality of versions of the at least one image corresponding to a different keyword style encoded into the at least one image;
    providing for display a listing of style-transferred images corresponding to the plurality of versions of the at least one image in a second region of the user interface;
    selecting one of the plurality of versions of the at least one image based on a user interaction with an style-transferred image from the listing of style-transferred images that corresponds to the selected one of the plurality of versions;
    determining a second keyword style that corresponds to the selected one of the plurality of versions; and
    applying the second keyword style to the displayed at least one image.

4. The computer-implemented method of claim 1, further comprising:
    selecting an image from the listing of images;
    providing for display the selected image in a first region of a user interface;
    obtaining a plurality of versions of the selected image, each version of the plurality of versions of the selected image corresponding to a different keyword style encoded into the selected image;

providing for display a listing of style-transferred images corresponding to the plurality of versions of the selected image in a second region of the user interface;

selecting one of the plurality of versions of the selected image based on a user interaction with an style-transferred image from the listing of style-transferred images that corresponds to the selected one of the plurality of versions;

determining a second keyword style of the selected one of the plurality of versions; and applying the second keyword style to the displayed image.

5. The computer-implemented method of claim 1, wherein determining the second collection of images comprises:

removing the one or more predetermined search terms from the search query to generate a new search query; and passing the new search query to an image search service for obtaining images that do not include style features that correspond to the one or more predetermined search terms.

6. The computer-implemented method of claim 1, further comprising:

tagging each of the images of the second collection of images with metadata identifying the applied keyword style for the image.

7. The computer-implemented method of claim 1, wherein each image in the list of images includes the keyword style that corresponds to the one or more predetermined search terms, wherein each image of the second collection of images is encoded with the keyword style and each image of the first collection of images is not modified to include the keyword style.

8. The computer-implemented method of claim 1, further comprising:

compiling a list of categories indicating categories that correspond to respective sets of style classes, each of the respective sets of style classes representing one of weather, time-of-day, and season; and compiling a list of terms for each category in the list of categories, the list of terms indicating terms that correspond to respective style classes for a corresponding set of style classes, wherein each of the one or more predetermined search terms corresponds to one of the terms of a compiled list of terms, and wherein the applied keyword style corresponds to one of the respective style classes of a corresponding set of style classes.

9. The computer-implemented method of claim 8, further comprising:

training a computer-operated convolutional neural network to predict a probability distribution over the compiled list of terms for each category of the compiled list of categories using a first set of training images and a second set of training images, the first set of training images including images that correspond to the one or more predetermined search terms and the second set of training images excluding the images that correspond to the one or more predetermined search terms; and generating a computer-operated style transfer model configured to map an image to a modified version of itself utilizing an output of the trained convolutional neural network, wherein the images of the second collection are modified through the style transfer model.

10. The computer-implemented method of claim 9, wherein the computer-operated convolutional neural network processes the first set of training images and the second set of training images to learn to identify features relating to at least one of a plurality of style classes, and further comprising:

generating feature vectors for each training image in the first set of training images and the second set of training images using the computer-operated convolutional neural network, wherein at least one of the feature vectors is associated with one of the one or more image identifiers.

11. The computer-implemented method of claim 10, further comprising:

generating processed pixel data based on the feature vectors from the plurality of sets of training images;

determining a probability for a style class of a set of style classes based on the processed pixel data, the determined probability indicating a likelihood that a subject image of the plurality of sets of training images corresponds to the style class; and providing an aggregate of style class probabilities in the probability distribution, the aggregate of style class probabilities including a style class probability for each style class in the set of style classes.

12. A system comprising:

one or more processors;

a computer-readable storage medium coupled to the one or more processors, the computer-readable storage medium including instructions that, when executed by the one or more processors, cause the one or more processors to:

receive user input identifying a search query from a client device;

identify one or more predetermined search terms in the search query by determining search terms in the search query that match at least one search term in a set of predetermined search terms;

identify one or more standard search terms in the search query by determining search terms in the search query that do not match at least one search term in the set of predetermined search terms;

access an image repository in a first search query, the first search query including the one or more standard search terms in the search query and the one or more predetermined search terms in the search query;

based on the first search query, filter through images in the image repository based on the one or more predetermined search terms in the search query;

return first images in a first collection of images from the filtered images, filtered based on the one or more predetermined search terms in the search query, that correspond to both the one or more standard search terms in the search query and the one or more predetermined search terms in the search query, the first collection of images including the returned first images;

access the image repository in a second search query, the second search query including the one or more standard search terms in the search query and excluding the one or more predetermined search terms in the search query;

based on the second search query, filter through the images in the image repository based on the one or more standard search terms in the search query;

return second images in a second collection of images from the filtered images, filtered based on the one or more standard search terms in the search query, that correspond to the one or more standard search terms in the search query and are not associated with the one or more predetermined search terms in the search query, the second collection of images including the returned second images;
determine a keyword style that corresponds to the one or more predetermined search terms in the search query;
apply the keyword style to the images in the second collection of images that result in a visual modification of the images in the second collection of images; and
provide a listing of images to the client device, the listing of images including the first collection of images and the images of the second collection of images that are modified with the applied keyword style.

13. The system of claim 12, wherein applying the keyword style to the images, comprises encoding one or more pixels of an image with the keyword style for each image of the second collection of images.

14. The system of claim 12, wherein the instructions further cause the one or more processors to:
provide for display at least one image of the second collection of images in a first region of a user interface;
obtain a plurality of versions of the at least one image, each version of the plurality of versions of the at least one image corresponding to a different keyword style encoded into the at least one image;
provide for display a listing of style-transferred images corresponding to the plurality of versions of the at least one image in a second region of the user interface;
select one of the plurality of versions of the at least one image based on a user interaction with an style-transferred image from the listing of style-transferred images that corresponds to the selected one of the plurality of versions;
determine a second keyword style that corresponds to the selected one of the plurality of versions; and
apply the second keyword style to the displayed at least one image; and
modify the displayed at least one image to transfer a keyword style of the selected one of the plurality of versions to the displayed at least one image for processing.

15. The system of claim 12, wherein the instructions further cause the one or more processors to:
compile a list of categories indicating categories that correspond to respective sets of style classes, each of the respective sets of style classes representing one of weather, time-of-day, and season; and
compile a list of terms for each category in the list of categories, the list of terms indicating terms that correspond to respective style classes for a corresponding set of style classes,
wherein each of the one or more predetermined search terms corresponds to one of the terms of a compiled list of terms, and
wherein the applied keyword style corresponds to one of the respective style classes of a corresponding set of style classes.

16. The system of claim 15, wherein the instructions further cause the one or more processors to:
train a computer-operated convolutional neural network to predict a probability distribution over the compiled list of terms for each category of the compiled list of categories using a first set of training images and a second set of training images, the first set of training images including images that correspond to the one or more predetermined search terms and the second set of training images excluding the images that correspond to the one or more predetermined search terms; and
generate a computer-operated style transfer model configured to map an image to a modified version of itself utilizing an output of the trained convolutional neural network, wherein the images of the second collection are modified through the style transfer model.

17. The system of claim 16, wherein the computer-operated convolutional neural network processes the first set of training images and the second set of training images to learn to identify features relating to at least one of a plurality of style classes, wherein the instructions further cause the one or more processors to:
generate feature vectors for each training image in the first set of training images and the second set of training images using the computer-operated convolutional neural network,
wherein at least one of the feature vectors is associated with one of the one or more image identifiers.

18. The system of claim 17, wherein the instructions further cause the one or more processors to:
generate processed pixel data based on the feature vectors from the plurality of sets of training images;
determine a probability for a style class of a set of style classes based on the processed pixel data, the determined probability indicating a likelihood that a subject image of the plurality of sets of training images corresponds to the style class; and
provide an aggregate of style class probabilities in the probability distribution, the aggregate of style class probabilities including a style class probability for each style class in the set of style classes.

19. A computer-implemented method, comprising:
receiving user input via an application on a client device, the user input indicating a request to initiate an image search;
generating, in response to the received user input, an image search query including one or more predetermined search terms from the user input;
providing for transmission the image search query over a connection to a server, the server including an image search service configured to:
identify one or more predetermined search terms in the search query by determining search terms in the search query that match at least one search term in a set of predetermined search terms;
identify one or more standard search terms in the search query by determining search terms in the search query that do not match at least one search term in the set of predetermined search terms;
access an image repository in a first search query, the first search query including the one or more standard search terms in the search query and the one or more predetermined search terms in the search query;
based on the first search query, filter through images in the image repository based on the one or more predetermined search terms in the search query;
return first images in a first collection of images from the filtered images, filtered based on the one or more predetermined search terms in the search query, that correspond to both the one or more standard search terms in the search query and the one or more predetermined search terms in the search query, the first collection of images including the returned first images;

access the image repository in a second search query, the second search query including the one or more standard search terms in the search query and excluding the one or more predetermined search terms in the search query;

based on the second search query, filter through the images in the image repository based on the one or more standard search terms in the search query;

return second images in a second collection of images from the filtered images, filtered based on the one or more standard search terms in the search query, that correspond to the one or more standard search terms in the search query and are not associated with the one or more predetermined search terms in the search query, the second collection of images including the returned second images;

determine a keyword style that corresponds to the one or more predetermined search terms in the search query; and apply the keyword style to the images in the second collection of images that result in a visual modification of the images in the second collection of images;

receiving a listing of images over the connection in response to the image search query, the listing of images including the first collection of images and the images of the second collection of images that are modified with the applied keyword style; and providing for display the listing of images.

* * * * *